UNITED STATES PATENT OFFICE.

EDWARD R. BARROW, OF MEMPHIS, TENNESSEE, ASSIGNOR TO BARROW COTTONSEED PRESERVER COMPANY, OF MEMPHIS, TENNESSEE, A CORPORATION OF TENNESSEE.

PROCESS FOR STERILIZING AND PRESERVING COTTON-SEED.

1,119,672.  Specification of Letters Patent.  Patented Dec. 1, 1914.

No Drawing.   Application filed November 18, 1913. Serial No. 801,718.

*To all whom it may concern:*

Be it known that I, EDWARD ROBERTSON BARROW, a citizen of the United States, residing at Memphis, in the county of Shelby and State of Tennessee, have invented certain new and useful Improvements in Processes for Sterilizing and Preserving Cotton-Seed; and I do hereby declare the following to be a full, clear, and exact description of the invention, such as will enable others skilled in the art to which it appertains to make and use the same.

My invention relates to an improved method of treating cotton seed in order to prevent the same from deterioration, due to the organic changes incident to heating, or sprouting, or both.

It is well known that the cotton seed varies largely from year to year in the quantity of water contained therein, and when it contains excessive moisture, and in this condition if it is subjected to external heat, or develops heat from germination, it tends to sprout, causing organic changes in the kernel which largely impair the value of the cotton seed, both as an oil producer and as an edible product. This tendency of the seed to heat up and sprout renders it necessary to work up the seed as promptly as practicable in the oil mills, and is largely prohibitive of the shipment of the seed in bulk in sea-going vessels, where the temperature is always more or less high in the cargo space of the vessel.

I have found that, by treating cotton seed with the hulls on, with ordinary sodium chlorid, the germinating power of the seed is destroyed, and the seed is maintained for long periods in a sound and unimpaired condition as far as the subsequent manufacture of the seed into cotton seed oil and food products is concerned, but, of course, the seed is sterilized.

The seed may be temporarily either immersed in the saline solution and then withdrawn therefrom and allowed to remain either in the wet condition, or dry, as preferred; or the salt may be applied in the pulverized dry form, being sprinkled thoroughly through the seed. The moisture of the seed and the air will tend to thoroughly impregnate the hulls of the seed with an aqueous saline solution, and this saline solution penetrating through the hulls will destroy the germinating power of the seed. Excellent results have been obtained with saline solution containing from 5% to 20% of salt and 95% to 80% of water, but I do not mean to limit my claims to any particular strength of solution, as this may be varied at will according to the nature of the seed, and length of time the seed is to be preserved, and other conditions which may arise. I also find that mixing 5% of the pulverized salt with 95% of the cotton seed gives excellent results, but the relative proportions of the salt and cotton seed may be varied at will.

The minute quantity of salt that passes through the hull and permeates the kernel will not be sufficient to impair the edibility of the cotton seed meal after the oil has been extracted, but, on the contrary, it would render the cotton seed meal more palatable as a stock food; while the salt would not in any way affect the chemical nature of the cotton seed oil, and could be readily washed out. It may be removed if desired, but as a matter of fact salt is often added to cotton seed oil to improve the flavor, and the amount of salt absorbed in my process would not be sufficient to injure the palatability of the oil.

The amount of salt would also be so small as not to materially impair the use of the cotton seed meal as a fertilizer.

One advantage of the herein described process of treating the cotton seed is that the salt and moisture causes the hull of the seed to swell and draw away from the kernel, so that when the seed is dry the hull becomes a loose envelop on the kernel, like the dry pod of a pea, and may be much more easily separated from the kernel than in the practice now in use, where the kernel comes from the hulls as the seed comes from the field without any preliminary treatment.

The seed need only be treated with the saline solution, or with the salt, long enough to be sterilized, and then it may be removed and dried; or, if desired, the seed mixed with the powdered salt may be stored away for an indefinite period.

By the herein described process the seed is placed in such a condition that it will keep indefinitely, and the operation of milling the same may be carried on throughout a series of months, or throughout the entire year, if desired; whereas under present conditions the seed must be hurried to the mill and promptly milled, as the milling season lasts only about four months, due to the probable deterioration of the seed if it be kept longer.

It will be obvious that the seed may be treated with salt at the gin after the staple cotton has been removed therefrom, and either before or after the seed has been delinted. The seed may be retained at the gin after such treatment with salt, or may be stored in any convenient warehouse at the mill, or elsewhere.

Having thus described my invention what I claim and desire to secure by Letters Patent of the United States is:—

1. The herein described process of treating cotton seed to sterilize and preserve the same, which consists in treating the same with small quantities of sodium chlorid and subsequently drying the seed, substantially as described.

2. The herein described process of treating cotton seed to sterilize and preserve the same, which consists in treating same with about 5% by weight of sodium chlorid and subsequently drying the seed, substantially as described.

3. The process of treating cotton seed to sterilize and preserve the same, which consists in mixing finely divided chlorid of sodium with the cotton seed having the hulls on, substantially as described.

4. The process of treating cotton seed to sterilize and preserve the same, which consists in mixing about 5% by weight of finely divided chlorid of sodium with the cotton seed having the hulls on, substantially as described.

5. The process of sterilizing and preserving cotton seed, which consists in treating the same in its natural condition, after the lint has been removed, with small quantities of chlorid of sodium, and subsequently evaporating off the excess of moisture, substantially as described.

In testimony whereof, I affix my signature, in presence of two witnesses.

EDWARD R. BARROW.

Witnesses:
 ERNEST WILKINSON,
 R. M. PARKER.